Feb. 3, 1970     C. JUND     3,492,861
STRAIN GAUGE ARRANGEMENT
Filed March 7, 1968     3 Sheets-Sheet 1

United States Patent Office 3,492,861
Patented Feb. 3, 1970

1

3,492,861
STRAIN GAUGE ARRANGEMENT
Christian Jund, Paris, France, assignor to CSF-Compagnie Generale de Telegraphie Sans Fil, a corporation of France
Filed Mar. 7, 1968, Ser. No. 711,256
Claims priority, application France, Mar. 15, 1967, 98,933
Int. Cl. G01l 1/00, 1/18, 1/22
U.S. Cl. 73—88.5                                   8 Claims

ABSTRACT OF THE DISCLOSURE

A strain gauge arrangement, comprises two field effect transistors. The respective channels are directed along the crystallographic axis and perpendicularly thereto. They are connected in series to a D.C. voltage source and the variations of the potential at the connection between the transistors upon the application of a stress are measured.

---

The present invention relates to semiconductor arrangements for measuring strains.

The production of a compressive or tensile stress in a semiconductor material, brings about a modification of its resistivity. This property has already been used in field-effect transistors, in particular as disclosed in the United States Patent 3,355,935, assigned to the same assignee.

It is an object of the invention to provide an improved arrangement of this type.

The applicant has found that stress effects are at a maximum when the stress is along the crystallographic axis of the material concerned, and accordingly the current flowing through it undergoes maximal variations when it flows in the same direction.

According to the invention, there is provided a strain gauge arrangement comprising a semiconductor crystalline body having a crystallographic axis, a first and a second field effect transistor formed in said body, said transistors being connected in series and having respective channels respectively extending in the direction of said axis and normally thereto; means for applying a voltage to said transistors in series; and means for measuring the potential at the connection between said transistors upon application of a stress along said axis.

For a better understanding of the invention and to show how the same may be carried into effect reference will be made to drawings accompanying the ensuing description and in which.

Similar reference numbers designate similar elements in all the figures.

Figure 1:
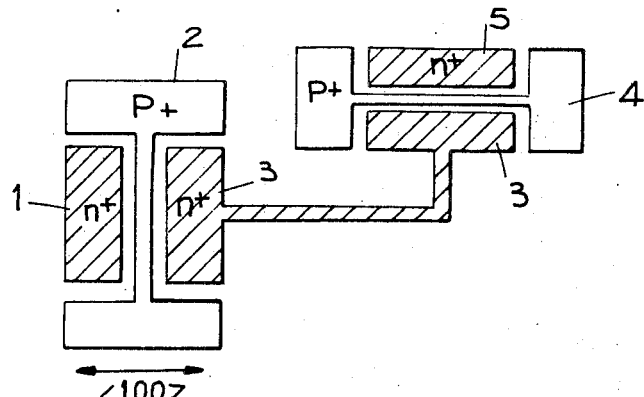
FIG. 1 is a plan view of an embodiment of the invention.

Two field-effect elements A and B are produced on a silicon layer 7 of n-type conductivity, formed by epitaxy on a silicon substrate 6 of p-type having a crystal axis $<100>$.

The field effect element A as an n+ type source 1, a p+ type gate 2, an n+ type drain 3. The drain 3, the source 1 and the gate 2 form a field effect system in which the current flows in the $<100>$ direction. The gate has the form of an I, the central branch of which is disposed in a direction perpendicular to the axis $<100>$; the source 1 and the drain 3 are disposed symmetrically between the horizontal bars of the I arrangement. The drain 3 is connected by an L-shaped connection to the source 3 of the field effect element B; the two elements forming an integral n+ type region. The element B has the same shape as the element A. The central branch of the I is parallel to the axis $<100>$. The element B includes a gate 4, the source 3 and a drain 5.

Figure 2:
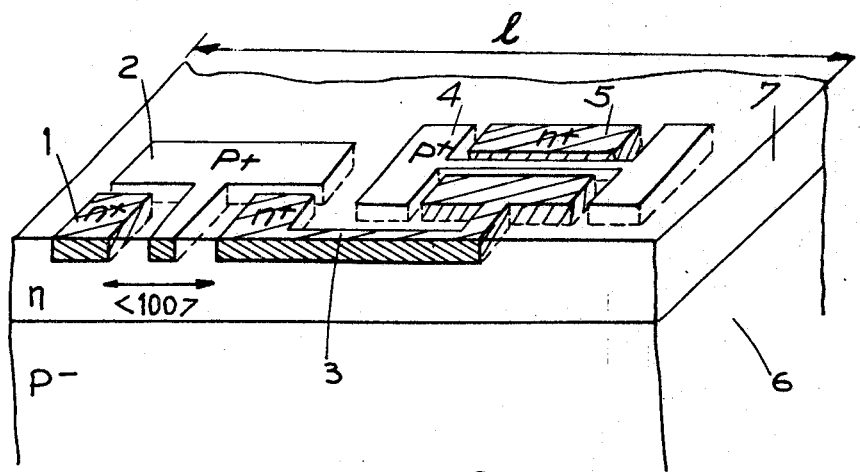
FIG. 2 is a view in perspective of an axial section of the arrangement shown in FIG. 1.
Figure 3:
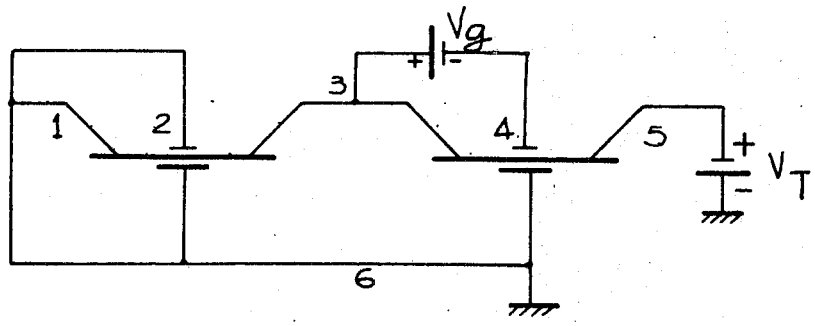
FIG. 3 is an equivalent circuit diagram.

FIG. 3 illustrates the equivalent circuit diagram of the device shown in FIGS. 1 and 2, with the associated voltage sources.

The source 1 of the element A is connected to the substrate 6 and to the gate 2. The drain of the element A and the source of the element B form a single body 3. The gate 4 is biased in relation to this body by means of the direct voltage source $V_G$. The drain 5 is connected to the general supply $V_T$, which is sufficient to saturate the two transistors, the polarities being as indicated in the drawing. The substrate 6 provides the ground connection.

A tensile or a compressive stress is now applied to the arrangement, in the $<100>$ direction. Experience shows that this stress has substantially different effects on the two field effect elements A and B.

Calling "gauge factor" the factor $$F_j = \frac{\Delta I/I}{\Delta l/l}$$

where $\Delta I/I$ designates the relative variation in the saturation current, and $\Delta l/l$ the relative variation of the length under the effect of the applied stress, the gauge factor $F_j$ for the element A, in which the current flows in the $<100>$ direction, is in the order of 100.

The current in the element B flows in a direction perpendicular to the former direction and experience shows that under these conditions $F_j$ is in the order of −50.

Figure 4:
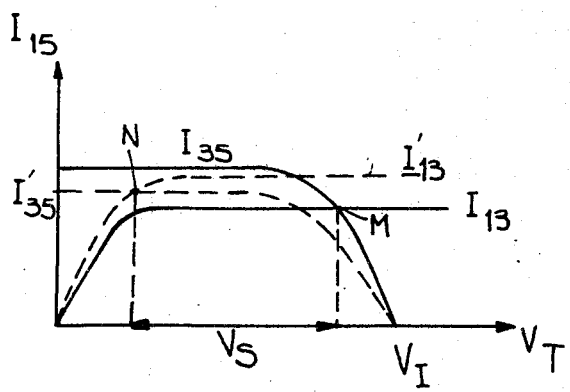
FIG. 4 is an explanatory graph.

For a given voltage $V_g$ and a given voltage $V_T$, FIG. 4 illustrates as a function of the voltage $V_{1-3}$, i.e. the voltage between the source 1 and the drain 3, the currents respectively flowing in the elements A and B, namely the current $I_{1-3}$ in the element A and the current $I_{3-5}$ in the element B, in the absence of any stress. Since the element B has its source connected to the drain of the element A, the voltage applied thereto is not the voltage $V_{1-3}$, but the voltage $V_T - V_{1-3}$, which explains that current $I_{3-5}$ is zero for $V_{1-3} = V_T$ and is saturated for $V_{1-3} = 0$. Accordingly the curve for the transistor B is the reverse of that for the transistor A. The transistor B loading the transistor A, the point of intersection M of these two curves defines the voltage $V_{1-3}$ applied to the transistor A, and the voltage $V_T - V_{1-3}$ for the current $I_{1-3} = I_{1-5}$ flowing through the assembly.

The curves $I'_{13}$ and $I'_{35}$, plotted under the same conditions but with a stress applied to the structure, intersect at another point, i.e. the point N, which corresponds to a voltage $V_{1-3}$ applied to the transistor A. The voltage $$V_{1-3} - V'_{1-3} = V_s$$

is a measure of the stress applied.

Figure 5:
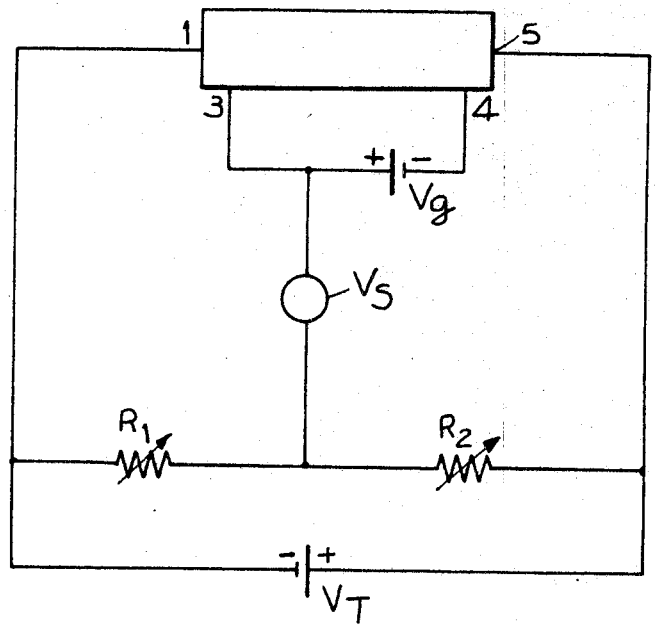
FIG. 5 is a circuit diagram.

The circuit of FIG. 5 shows by way of example how the applied stresses can be measured.

Two resistors $R_1$ and $R_2$ are arranged in a bridge circuit between the source 1 and the drain 5 and a voltmeter $V_5$ is arranged between the + pole of the supply $V_g$ and the junction between two resistors $R_1$ and $R_2$.

Resistors $R_1$ and $R_2$ are so adjusted that the voltage $V_s$, measured by the voltmeter $V_5$, is zero, when no stress is applied to the assembly A–B. The application of a stress results in the appearance of a voltage $V_s$ between the + pole of the source $V_g$ and the junction between the resistors $R_1$ and $R_2$.

This voltage is the difference between voltages, which correspond to the points of intersection M and N. It should be pointed out that the substrate $p$ being more weakly doped than the epitaxially deposited n-type silicon, and therefore the current in the n-type region cannot be modified by any penetration of a space charge due to the presence of the substrate p, since such space charge will develop in the more weakly doped p region.

What is claimed is:

1. A strain gauge arrangement comprising a semiconductor crystalline body having a crystallographic axis, a first and a second field effect transistor formed in said body, said transistors being connected in series and having respective channels respectively extending in the direction of said axis and normally thereto; means for applying a voltage to said transistor in series; and means for measuring the potential at the connection between said transistors upon application of a stress along said axis.

2. A strain gauge arrangement as claimed in claim 1, wherein said structure comprises a substrate of a given type of conductivity, each of said transistors comprising a source and a drain of the opposite type of conductivity and a gate of said given type of conductivity.

3. An arrangement as claimed in claim 2, wherein said substrate is of the p-type of conductivity, said sources and said drains are in the n+ type of conductivity, said gates are of the p+ type of conductivity.

4. An arrangement as claimed in claim 1, wherein said second transistor has means for biasing its gate with respect to its source.

5. An arrangement as claimed in claim 4, wherein said gates of said first and second transistors effect the shape of an I, the axes of said respective I being mutually perpendicular, the axis of said gate of said second transistor being perpendicular to said crystallographic axis.

6. An arrangement as claimed in claim 5, wherein said sources and said drains of said first and second transistors are located symmetrically with respect to said axis of said respective gates.

7. An arrangement as claimed in claim 6, wherein said source of said second transistor and said drain of said first transistor are connected to each other by a L-shaped conductive body.

8. An arrangement as claimed in claim 1, wherein said measuring means comprises, in series, a first and a second resistor connected in parallel with said transistors, means for adjusting said resistors, and voltage measuring means, connected between the respective junction points between said transistors and said resistors.

References Cited

UNITED STATES PATENTS

| | | | |
|---|---|---|---|
| 3,355,935 | 12/1967 | Grosvalet | 73—88.5 |
| 3,446,064 | 5/1969 | Bowman | 73—88.5 |

CHARLES A. RUEHL, Primary Examiner

U.S. Cl. X.R.

307—308